United States Patent [19]
Hostenske

[11] Patent Number: 5,810,300
[45] Date of Patent: Sep. 22, 1998

[54] HANDREST FOR AUTOMOTIVE RADIO

[75] Inventor: David Hostenske, Issaquah, Wash.

[73] Assignee: Paccar Inc., Bellevue, Wash.

[21] Appl. No.: 349,519

[22] Filed: Dec. 5, 1994

[51] Int. Cl.$^6$ .................................................. B68G 5/00
[52] U.S. Cl. ............................................................ 248/118
[58] Field of Search ............................... 248/118; 180/90;
455/347, 348, 349, 351; D14/188, 196,
257, 258; D12/192

[56] References Cited

U.S. PATENT DOCUMENTS

| | | | |
|---|---|---|---|
| Re. 33,556 | 3/1991 | Berke | 211/69.1 |
| D. 96,943 | 9/1935 | Tjaarda | D12/192 |
| D. 129,751 | 9/1941 | Budlong | D14/258 |
| D. 211,016 | 5/1968 | Deli et al. | D12/192 |
| D. 248,462 | 7/1978 | Bell | D12/192 |
| D. 284,081 | 6/1986 | Taylor | D14/257 |
| D. 284,751 | 7/1986 | Soederberg | D12/192 |
| D. 321,512 | 11/1991 | Kanari | D14/258 X |
| D. 327,682 | 7/1992 | Shimazu | D14/188 X |
| D. 336,459 | 6/1993 | Tisten et al. | D12/192 |
| D. 351,167 | 10/1994 | Yun | D14/258 X |
| D. 378,585 | 3/1997 | Duguid et al. | D12/192 |
| 1,955,521 | 9/1934 | White | 218/5 |
| 2,411,528 | 11/1946 | Dodington | 455/347 X |
| 2,662,975 | 12/1953 | Schwarz | 455/348 X |
| 3,020,400 | 2/1962 | Rosario | 250/16 |
| 3,040,832 | 6/1962 | Wilfert | 180/90 |
| 3,451,500 | 6/1969 | Porsche et al. | 180/90 |
| 3,452,835 | 7/1969 | Deli et al. | 180/90 |
| 4,168,095 | 9/1979 | Temino et al. | 296/70 |
| 4,421,190 | 12/1983 | Martinson et al. | 180/90 |
| 4,471,848 | 9/1984 | Skytoen | 180/90 |
| 4,481,556 | 11/1984 | Berke et al. | 361/222 |
| 4,482,064 | 11/1984 | Berke et al. | 248/118 X |
| 4,518,172 | 5/1985 | Bortz et al. | 180/90 X |
| 4,530,517 | 7/1985 | Miyabayashi et al. | 280/752 |
| 4,623,992 | 11/1986 | Kurosaki et al. | 455/347 X |
| 4,924,957 | 5/1990 | Gigla | 180/90 |
| 4,960,623 | 10/1990 | Levinson | 180/90 X |
| 5,048,784 | 9/1991 | Schwartz et al. | 248/244 |
| 5,073,978 | 12/1991 | Mastrippolito | 455/346 |
| 5,159,714 | 10/1992 | Cosentino et al. | 455/347 |
| 5,224,751 | 7/1993 | Hirashima et al. | 180/90 X |
| 5,259,655 | 11/1993 | Anderson | 180/90 X |
| 5,515,345 | 5/1996 | Barreira et al. | 369/6 |

Primary Examiner—Daniel P. Stodola
Assistant Examiner—Richard M. Smith
Attorney, Agent, or Firm—Seed and Berry LLP

[57] ABSTRACT

A hand support member for stabilizing a hand of a user in a selected position adjacent to a controllable component carried by a vehicle instrument panel. The controllable component has a control device that is controllable by a first portion of a user's hand, and the hand support member is connected to the vehicle instrument panel adjacent to the controllable component. The hand support member has a support portion rigidly located in a selected position away from the instrument panel and adjacent to the controllable component such that the selected position enables the user to rest, for example, the heel or palm of his hand on the support portion so as to be supported in a stable, generally non-moving position relative to the control device, such that the fingers of the user's hand can engage and activate the control device.

1 Claim, 3 Drawing Sheets

HANDREST FOR AUTOMOTIVE RADIO

TECHNICAL FIELD

The present invention is directed toward handrests and more particularly, toward handrests mounted on vehicle instrument panels.

BACKGROUND OF THE INVENTION

A vehicle, such as an automobile, a truck, a boat, an airplane, or the like, typically has several components, such as instruments, dials, accessories, and controls, mounted to a dash panel and these components facilitate operation of the vehicle by an operator. The dash panel supports the several components in a pre-selected arrangement that allows the operator to see or access the components while operating the vehicle.

The vehicle and its operator often experience a rough ride because of uneven terrain, turbulence, or excessive vibration, and this rough ride makes it difficult for the operator to steady his hand relative to, for example, one or more of the components mounted on the dash panel. As a result, the operator's hand easily and involuntarily moves relative to the components, thereby making it difficult to activate the component while operating the vehicle.

The components in a dash panel, such as a radio or the like, typically have pushbutton controls and knobs that are flush or nearly flush with the radio faceplate or with the dash panel. These pushbuttons and knobs are not adapted to be grabbed by the operator so as to support and stabilize his hand relative to the radio. Thus, the operator is often unable to keep his hand steady relative to the radio during operation of the vehicle, for example, when the vehicle experiences a rough ride, and thus the operator often results to stabbing at a component or trying repeatedly to keep his hand on the component until it is properly adjusted.

SUMMARY OF THE INVENTION

The present invention provides a hand support member for stabilizing a hand of an operator in a selected position adjacent to a controllable component that is carried by a vehicle instrument panel. The component has a control device that is controllable by a first portion of the operator's hand, and the hand support member is connected to the vehicle's instrument panel adjacent to the component. The hand support member has a support portion located in a predetermined position away from the instrument panel and adjacent to the controllable component such that a second portion of the operator's hand can be supported by the support portion in a stable, generally non-moving position relative to the control device when the first portion of the operators' hand engages the control device. As a result, the operator's hand is stabilized on the hand support member to minimize movement of the operator's hand relative to the control device during operation of the vehicle.

In a preferred embodiment of the invention, the hand support member is a stabilizing bar having left and right portions that are rigidly and non-pivotally mounted to the instrument panel adjacent to respective left and right sides of the controllable component. The support portion extends between the left and right portions of the stabilizing bar and is located outwardly away from a front face of the controllable component and below a bottom side of the front face at the selected position away from the instrument panel. The location of the bar's support portion below the bottom side of the front face allows the operator to rest the palm portion of his hand on the stabilizing bar or to grab the bar with one or more fingers while engaging the control device of the controllable component with other fingers.

DETAILED DESCRIPTION OF THE INVENTION

Figure 1:
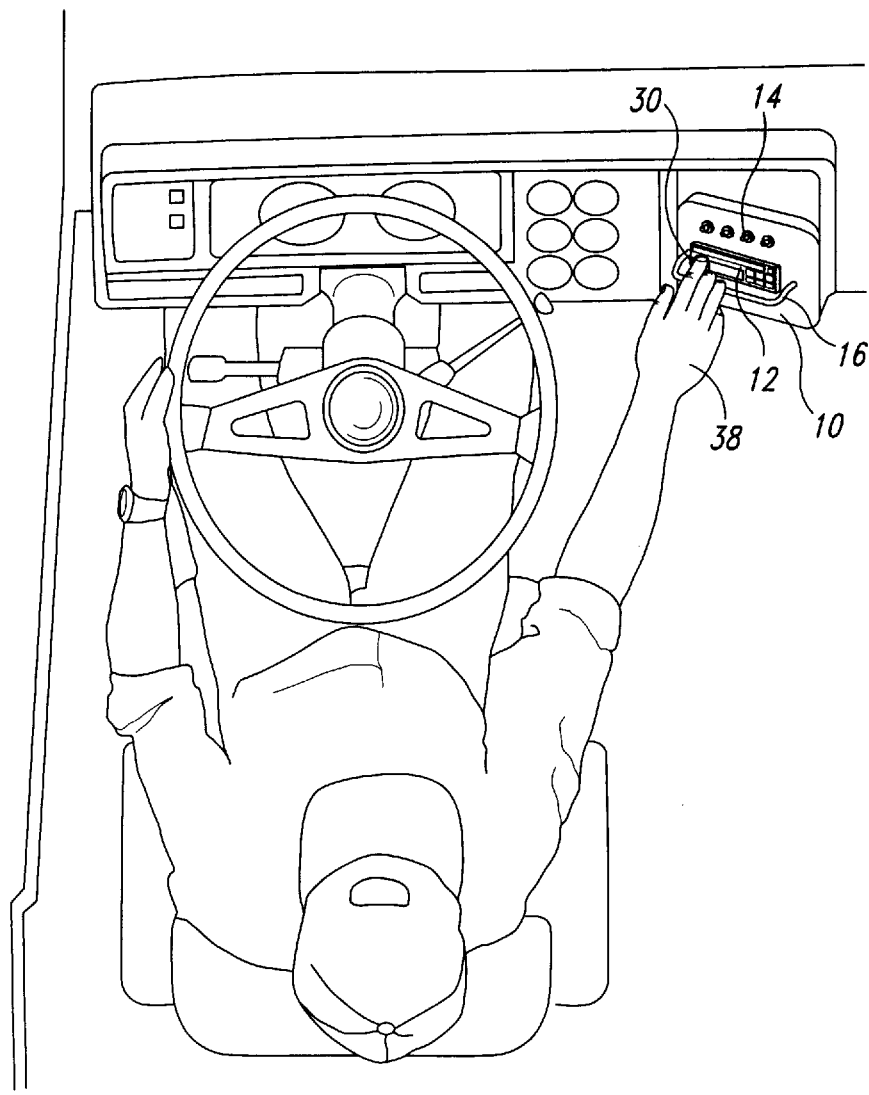
FIG. 1 is an isometric view of a vehicle instrument panel with a radio mounted therein and a hand stabilizing bar in accordance with the present invention attached to the instrument panel adjacent to the radio.

A vehicle instrument panel 10 is shown in FIG. 1 with radio 12 and a plurality of other components 14 carried by the instrument panel. A hand stabilizing bar 16 in accordance with the present invention is mounted to the instrument panel 10 adjacent to the radio 12, which includes control devices 30 that are controllable by an operator. The hand stabilizing bar 16 is illustrated and discussed below as being mounted to the instrument panel 10 of a long-haul truck, although the hand stabilizing bar can be used with instrument panels of other vehicles, such as automobiles, airplanes, boats, or the like.

The instrument panel 10 has the various components 14 arranged such that the operator can see and activate controllable components while operating the truck. During operation, however, the truck often experiences a rough ride such that the operator's body and hands move relative to the instrument panel. The hand stabilizing bar 16 allows the operator to rest a portion of his hand on the stabilizing bar while, for example, adjusting the control device 30 on the radio 12 so his hand does not involuntarily move relative to the radio.

Figure 2:
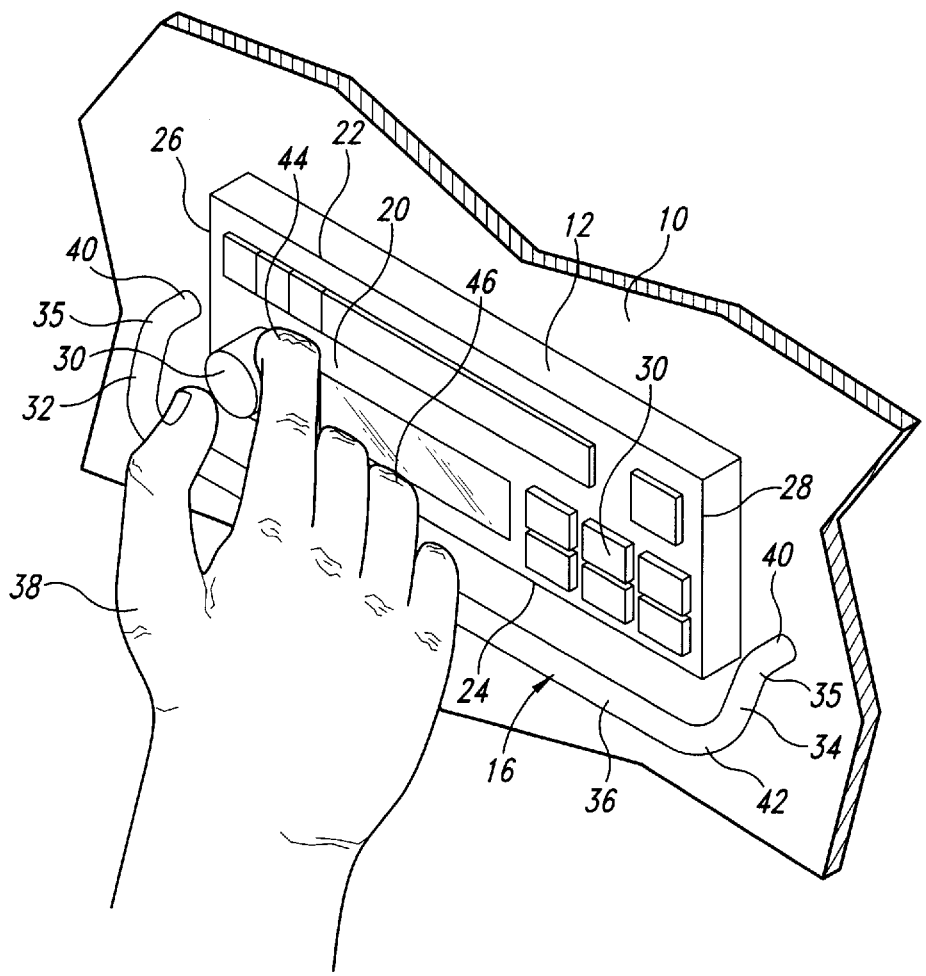
FIG. 2 is an enlarged isometric view of the radio and the hand stabilizing bar attached to the instrument panel adjacent to opposite sides of the radio.

As best seen in FIG. 2, the instrument panel 10 is illustrated as a substantially vertical panel and the radio 12 is mounted in the instrument panel in a non-flush manner such that a front face 20 of the radio is parallel to the instrument panel 10 and positioned a selected distance outwardly away from the instrument panel. The radio's front face 20 is defined by a top portion 22, a bottom portion 24 opposite the top portion, and left and right portions 26 and 28 extending between the top and bottom portions on opposite sides of the radio. The control devices 30, such as control knobs, pushbuttons, or the like, are mounted on the radio front face 20 and are adapted to control different functions of the radio 12.

The hand stabilizing bar 16 is rigidly mounted to the instrument panel 10 adjacent to the radio 12 so as to support the weight of the user's hand without the stabilizing bar moving relative to the radio, thereby facilitating adjustment of the radio by the operator. Although the hand stabilizing bar 16 is illustrated adjacent to the radio 12, the hand stabilizing bar in accordance with the present invention can be positioned adjacent to one or more other components mounted to the instrument panel 10. The hand stabilizing bar 16 is a contoured bar having a substantially circular cross-section with a left end portion 32 that is rigidly mounted to the instrument panel 10 adjacent to the left portion 26 of the radio's front face 20, and the contoured bar has a right end portion 34 rigidly mounted to the instrument panel adjacent to the right portion 28 of the front face. A middle support portion 36 of the hand stabilizing bar 16 extends between the left and right end portions 32 and 34. The middle support portion 36 is positioned such that a portion of the operator's hand 38 can engage or be supported by the middle support portion while another portion of the hand is simultaneously activating one or more of the control devices 30. This invention is particularly useful for activating flush or flat control devices 30, such as push buttons, which are quite popular on today's automobile radio equipment.

In the illustrated embodiment, the left and right end portions 32 and 34 of the hand stabilizing bar 16 are each rigidly and non-pivotally fastened at the front section 40 to a support structure of the instrument panel 10 which carries the weight of the instrument panel and attaches to the vehicle's structural frame (not illustrated). The front section 40 extends perpendicularly rearward from the instrument panel 10 to an intermediate section 35. The left and right end portions 32 and 34 bend downwardly at the intermediate section 35 and extend downwardly and rearwardly relative to the instrument panel 10, and the end portions terminate at a rear section 42. Accordingly, the forward section 40 of each of the left and right end portions 32 and 34 is positioned above the respective rear section 42. The rear sections 42 of the left and right end portions 32 and 34 bend toward each other and connect to the middle support portion 36 which extends therebetween such that the middle support portion is below the bottom portion 24 of the radio's front face 20. Thus, the middle support portion 36 is substantially parallel to both the instrument panel 10 and the bottom portion 24 of the radio's front face 20.

The left and right support members 32 and 34 and the middle support portion 36 are integrally connected and contoured with the middle support portion located below and outwardly away from the instrument panel 10. This arrangement allows the operator to engage one or more of the control devices 30 with one or more fingers 44 while the other fingers 46 or other selected portion of the operator's hand 38 engages the hand stabilizing bar 16 and supports his hand in a stable, generally non-moving position relative to the radio and the control device. Accordingly, the hand stabilizing bar 16 allows an operator to engage the control device 30 with one portion of his hand 38 while a second portion of the operator's hand is stabilized on the hand stabilizing bar.

Although the illustrated embodiment utilizes a contoured hand stabilizing bar 16 as discussed above, the hand stabilizing bar can be constructed so as to rigidly engage the instrument panel 10 and, for example, to extend straight out from the instrument panel so the hand stabilizing bar is completely within a plane that is perpendicular to the component support portion. The hand stabilizing bar 16 could have other configurations and shapes that enable the operator to support his hand and to prevent involuntary movement of the hand relative to the instrument panel 10.

Figure 3:
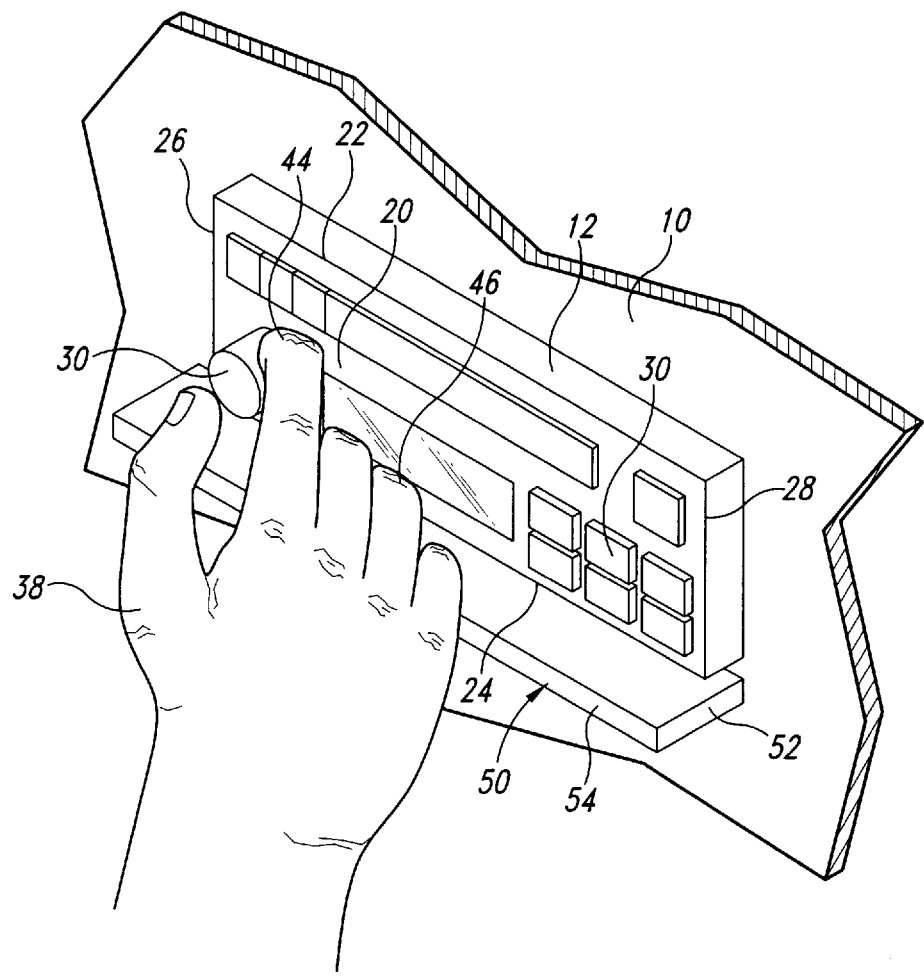
FIG. 3 is an isometric view of an alternate embodiment of the present invention showing a portion of a vehicle instrument panel with the radio mounted therein and a hand support plate attached to the instrument panel below the radio.

As best seen in FIG. 3, an alternate embodiment of the present invention is illustrated wherein a hand stabilizing plate 50 is rigidly and non-pivotally connected to the instrument panel 10. The hand stabilizing plate 50 is an elongated rectangular member having a forward edge 52 that securely engages the instrument panel 10 below the bottom portion 24 of the radio's front face 20, and the plate cantilevers outwardly away from the instrument panel such that a rearward end 54 of the plate is located rearwardly of the radio's front face 20. The hand stabilizing plate 50 has a middle support portion 60 that extends between left and right ends 56 and 58, with the left and being located just below the left side portion 26 of the radio's front face 20 and the right end being located below the right side portion 28 of the radio's front face. Accordingly, the hand stabilizing plate 50 provides a rigid, non-pivotal structure mounted to the instrument panel 10 adjacent to the radio 12 such that the operator can rest a first portion of his hand on the hand stabilizing plate while a second portion of his hand activates one or more of the radio control devices 30. The fingers can rest on the bar 16 or plate 50 and depress the selected push button without the need to grip the bar or plate. Although the illustrated embodiment of the hand stabilizing plate is a cantilevered member, other shapes or configurations of the hand stabilizing plate, such as a plate having a triangular cross-section or the like, can be used.

The invention is particularly useful for activating radios that are not at the standard eye level on a dashboard. For example, the radio in some truck designs is at or above the shoulder level. In one truck design, the radio is actually above the eye level. The user can easily rest his hand on the bar 16 and make his selection, even when the radio is above the standard dashboard position.

Therefore, when an operator of a vehicle encounters a rough ride, the operator can operate the selected components 14 on the instrument panel 10 by resting and stabilizing his hand on the hand stabilizing member to minimize involuntary movement of his hand relative to the components, thereby efficiently and easily allowing the operator to activate the selected component positioned adjacent to the hand stabilizing member.

Although particular embodiments have been described in this application for illustrative purposes, the claims are not limited to the embodiments described herein. Equivalent devices may be substituted for those described, which operate according to the principles of the present invention and thus fall within the scope of the claims.

What is claimed is:

1. An instrument panel assembly of an automotive vehicle having a dash board, comprising:

a panel portion of the instrument panel assembly, the panel portion being vertically oriented in a first plane;

a radio mounted in the panel portion, the radio having a vertically oriented front face plate positioned in a second plane, the second plane being different than the first plane, the radio having a control device in the front face plate and positioned to be engaged by a hand of a user, the front face plate having a top side, a bottom side opposite the top side, a left side extending between the top and bottom side, a right side opposite the left side; and a hand stabilizing bar mounted to the panel portion, the stabilizing bar having a first end rigidly mounted adjacent to the left side of the front face plate and a second end rigidly mounted adjacent to the right side of the front face plate, the stabilizing bar having a left portion connected to the first end and extending from the panel portion away from the first plane in a direction substantially perpendicular to the panel in the first plane, and a right portion connected to the second end and extending from the panel portion away from the first plane in a direction substantially perpendicular to the panel in the first plane, and a middle portion extending horizontally between the left and right portions substantially parallel to the front face plate, said middle portion being located outwardly away from the face plate such that the second plane is between the middle portion and the first plane, the middle portion further being positioned below the bottom side of the front face plate at a pre-selected distance from the control device whereby a first portion of the user's hand engaging the bar is stabilized from movement relative to the control device while a second portion of the user's hand engages the control device the stabilizing bar being rigidly mounted to the panel portion and having a strength that can support the user's hand without the stabilizing bar moving relative to the radio.

* * * * *